United States Patent [19]

Paetz et al.

[11] Patent Number: 5,154,481
[45] Date of Patent: Oct. 13, 1992

[54] VEHICLE ROOF WITH SOLAR POWER SOURCE AND CONTACT DEVICE

[75] Inventors: Werner Paetz, Freising; Klaus Meiler, Poecking; Thomas Schumacher, Lauingen; Horst Bienert, Gauting; August Hirschberger, Munich; Hermann Pfisterer, Stockdorf; Manfred Hoeller, Munich, all of Fed. Rep. of Germany

[73] Assignee: Webasto AG Fahrzeugtechnik, Stockdorf, Fed. Rep. of Germany

[21] Appl. No.: 723,905

[22] Filed: Jul. 1, 1991

[30] Foreign Application Priority Data

Jun. 29, 1990 [DE] Fed. Rep. of Germany ....... 4020655

[51] Int. Cl.$^5$ .............................................. B60J 7/04
[52] U.S. Cl. .................................. 296/211; 296/215; 296/216; 200/61.73; 200/61.74; 200/61.78
[58] Field of Search ................ 296/211, 215, 216; 98/2.14, 900; 200/61.62, 61.71–61.76, 61.78

[56] References Cited

U.S. PATENT DOCUMENTS

| | | | |
|---|---|---|---|
| 3,056,628 | 10/1962 | Golde | 296/219 |
| 3,545,806 | 12/1970 | Ventre | 296/223 |
| 4,175,785 | 11/1979 | Leiter | 296/214 |
| 4,320,921 | 3/1982 | Schaetzler | 296/213 |
| 4,556,765 | 12/1985 | Shaw et al. | 200/61.71 |
| 4,717,199 | 1/1988 | Kohlpaintner et al. | 296/214 |
| 4,934,753 | 6/1990 | Gajewski | 296/211 X |

FOREIGN PATENT DOCUMENTS

| | | | |
|---|---|---|---|
| 3545014 | 6/1987 | Fed. Rep. of Germany | 296/211 |
| 8802882U1 | 10/1988 | Fed. Rep. of Germany | . |
| 3830484 | 3/1989 | Fed. Rep. of Germany | 296/211 |
| 8815676U1 | 3/1989 | Fed. Rep. of Germany | . |
| 0282021 | 11/1989 | Japan | 296/211 |
| 2122250 | 1/1984 | United Kingdom | . |

Primary Examiner—Dennis H. Pedder
Attorney, Agent, or Firm—Sixbey, Friedman, Leedom & Ferguson

[57] ABSTRACT

Vehicle roof with at least one cover that, alternatively, closes or at least partially opens an opening in a fixed roof surface of the vehicle, carries a solar power source for supplying power to at least one power consuming device that is separately located from the cover, and with a contact device for producing an electrical connection between the solar power source and the consuming device. The contact device is made as a switch arrangement that incorporates the cover so that the power consuming device is connected to the solar power source in one or more predetermined cover positions and is disconnected from the solar power source in all other cover positions.

8 Claims, 11 Drawing Sheets

VEHICLE ROOF WITH SOLAR POWER SOURCE AND CONTACT DEVICE

BACKGROUND OF THE INVENTION

The invention relates to a vehicle roof with at least one cover carrying a solar power source for alternatively closing or at least partially opening a roof opening, with at least one power consuming device that is fed from the solar power source and that is placed separate from the cover, preferably, integral with the vehicle, and with a contact device for producing an electrical connection between the solar power source and the power consuming device.

In a known vehicle roof of this kind (German Offenlegungsschrift No. 38 30 484), the contact device has at least one conductor rail extending in the cover sliding direction and at least one sliding contact that is kept in electrical contact with the conductor rail independently of the respective cover sliding position.

Further, ventilation devices are known for vehicle lifting roofs with a push-out cover (German Utility Model Nos. 88 08 782 U1 and 88 15 676 U1), in which a fan with a drive motor fed from a solar power source is attached to the cover on the vehicle interior either on a strut integral with the roof or on the cover. To turn the fan drive motor alternatively on and off, a hand switch is provided that lies in a circuit leading from the solar power source to the drive motor.

The use of a solar power source in a vehicle is especially advantageous when the vehicle is parked and the vehicle battery is not being recharged by the generator because the vehicle engine is not running. The solar power source makes it possible, with a turned-off vehicle engine, to operate power consuming devices, e.g., a fan, even for a prolonged time, without the danger of excessively discharging the vehicle battery. In this way, even when a vehicle is parked in the sun, an acceptable interior temperature can be maintained.

SUMMARY OF THE INVENTION

The primary object of the present invention is to make a vehicle roof in which the solar power source is brought into current-carrying connection with a power consuming device in an especially effective and convenient way.

This object is achieved according to preferred embodiments of the invention by designing the contact device, in a vehicle roof with at least one cover carrying a solar power source for alternatively closing or at least partially opening a roof opening, with at least one power consuming device that is fed from the solar power source and that is spaced apart from the cover, preferably integral with the vehicle, and with a contact device to produce an electrical connection between the solar power source and the power consuming device, as a switch arrangement and the cover as part of this switch arrangement so that, depending on the cover position, the consuming device is connected to the solar power source in one or more predetermined cover positions and is disconnected from the solar power source in all other cover positions.

The solution according to the invention exploits the fact that, in a vehicle equipped with a sliding roof, a sliding-lifting roof, a spoiler roof, ventilation roof, or the like, the cover, for safety reasons, is usually brought into a predetermined cover position, or into one of several predetermined cover positions, generally the forwardmost cover position, when the vehicle is to be parked. Thus, the vehicle roof according to the invention can make do without an additional, hand-operated switch in the circuit between the solar power source and the consuming device. If, nevertheless, such an additional switch is provided, it can normally remain in the closed position. In such a case, this switch is operated only in special cases; for example, especially, when for some reason, as an exception, it is not desired that the power consuming device be connected to the solar power source while the cover is in the predetermined cover positions).

In a cover that can be brought into the forwardmost cover position by alternatively swinging into a closed position, from a position where the rear edge is pushed out above the stationary roof surface and/or from a position where the rear edge of the cover lowered beneath the stationary roof skin, the switch arrangement, preferably, is designed so that it remains closed in each of the mentioned positions.

Suitably, the switch arrangement has at least one switch contact that is connected to the cover or to a part that is integral with the cover and at least one other switch contact that comes into contact with it in a predetermined cover position and which is connected to a part that is integral with the roof, a wind deflector and/or to a push-out arm for the wind deflector. Furthermore, at least one of the two interacting switch contacts is made resilient with respect to the other contact and/or is spring-mounted, to compensate for unavoidable manufacturing and assembly tolerances and to achieve a contact pressure that assures a low-resistance current transfer between the pair of interacting switch contacts.

When the contact areas of the two interacting switch contacts that come into contact with one another are placed in a vertical or an almost vertical plane and the contact area of the switch contact integral with the roof lies at or near the cover pivot axis, a certain mutual contacting of the switch contacts can be guaranteed without problem, even in the area of the pivoting movement of the cover.

In another embodiment of the invention, a carrier part of the switch contact which is connected with the cover is resiliently prestressed relative to the cover in a vertical direction. This makes it possible to adjust the height of the cover without, thus, changing the height of the switch contact accompanies the cover in its movements relative to the height of the switch contact that is integral with the roof. If the carrier part that is resiliently prestressed in the vertical direction is braced on a cover inside roof lining arranged to slide under the cover along guide mechanisms integral with the roof, a flapping of the cover inside roof lining is simultaneously avoided without additional component being needed.

Embodiments of the vehicle roof according to the invention are described in further detail below with reference to the accompanying figures of the drawings.

DETAILED DESCRIPTION OF THE PREFERRED EMBODIMENTS

The vehicle roof illustrated in FIGS. 1 to 4 has a cover 10 that makes it possible to alternately close or at least partially open a roof opening 12 made in a stationary roof surface 11. The vehicle roof illustrated is a sliding-lifting roof whose cover 11 can be pushed upward so that its rear edge 13 is located above the stationary roof surface 11, or can be slid rearward under the stationary roof surface 11 after lowering of the cover rear edge 13. Suitable cover adjustment mechanisms are known (e.g., U.S. Pat. No. 4,320,921) and thus, do not require further explanation here. But, the vehicle roof can, among other things, also be designed in a way known in the art as a "spoiler" roof (e.g., published UK Patent Application No. 21 22 250 A) in which the pushed-out cover can be slid rearward over the stationary roof surface 11.

Cover 10 carries a solar power source that is made, in the illustrated embodiment, as a solar unit 15 that extends over the entire, or almost the entire, cover surface. Solar unit 15 is equipped, in a way not shown in more detail, with a layer of solar cells made of crystalline or amorphous semiconductor material, in particular silicon. Solar unit 15 is connected, according to FIGS. 3 and 4, to a metal plate 16 of the cover 10, for example, it is bonded to its entire surface. The cover also comprises a metal inner plate 17, a frame-shaped reinforcement 18, a mounting angle bracket 19 and a cover seal 20 extending around the cover further belong to cover 10. The cover and the roof parts interacting with the cover are made essentially in mirror symmetry with reference to a longitudinal axis of symmetry. Thus, the description below for the left side of the cover also applies, analogously, to the right side of the cover.

An inside roof lining transport bolt 22 is attached to mounting angle bracket 19 near forward cover edge 21, and interacts with an inside roof lining transport hook 23 of a cover inside roof lining 24 as is known, for example, from U.S. Pat. No. 4,717,199. In this way, cover inside roof lining 24, which is located under cover 10, is made to accompany cover 10 in its sliding movements in the longitudinal vehicle direction. In doing so, the side edges of inside roof headliner 24 interact with lateral longitudinal guide mechanisms 26 that are integral with the roof and that are formed as part of a roof frame 25. A wind deflector that extends along the forward edge of roof opening 12 and that automatically swings up from the illustrated rest position into a working position when cover 10 is slid rearward is indicated at 27 FIG. 4).

Metal inner plate 17 of the cover 10 is provided in both forward corner areas, and in each case, a bore 28 is provided for a soldered connection 29 (FIG. 3) by which a cable 30 is electrically connected with solar unit 15. Cable 30 leads to a switch contact 31 that accompanies the cover in its movements and that is a part of a switch arrangement designated overall by 32. The switch arrangement 32 also includes a switch contact 33 which is fixed to a stationary part of the roof. Switch contact 31 has a contact plunger 35 that is guided in a plastic housing 36 in a manner such that it is able to slide crosswise to the vehicle longitudinal direction and to the sliding direction of cover 10, but is prevented from turning.

Figure 1:
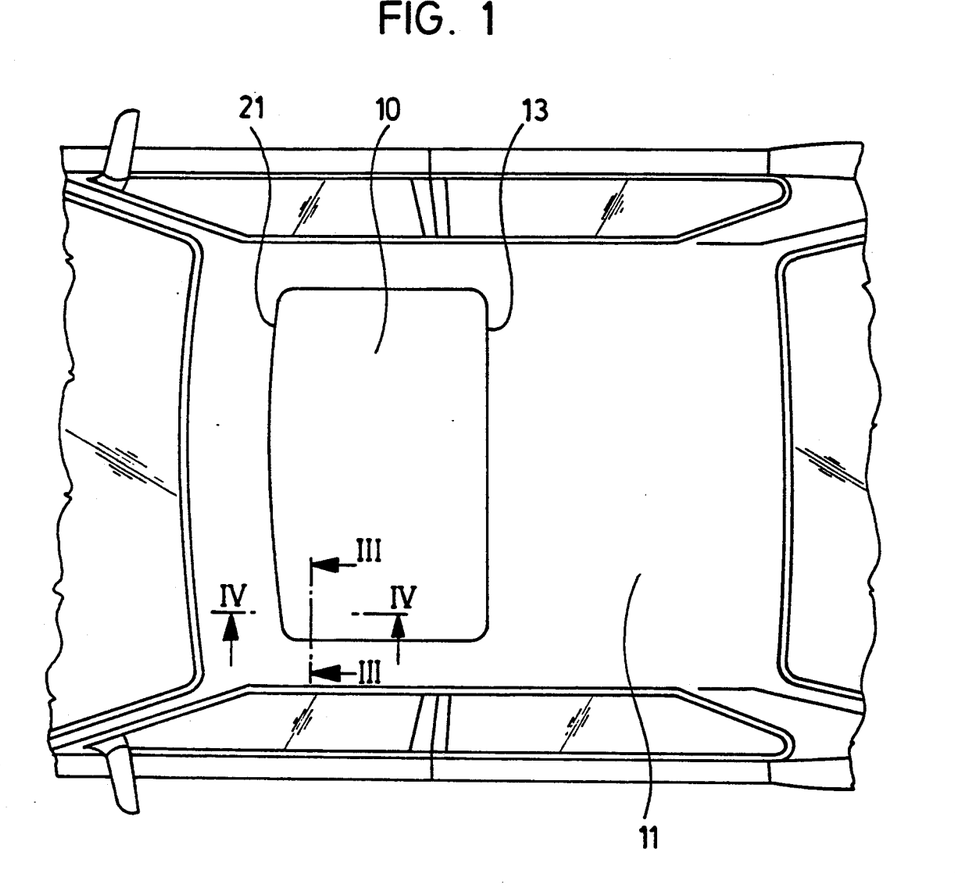
FIG. 1 is a top view of a vehicle roof.
Figure 2:
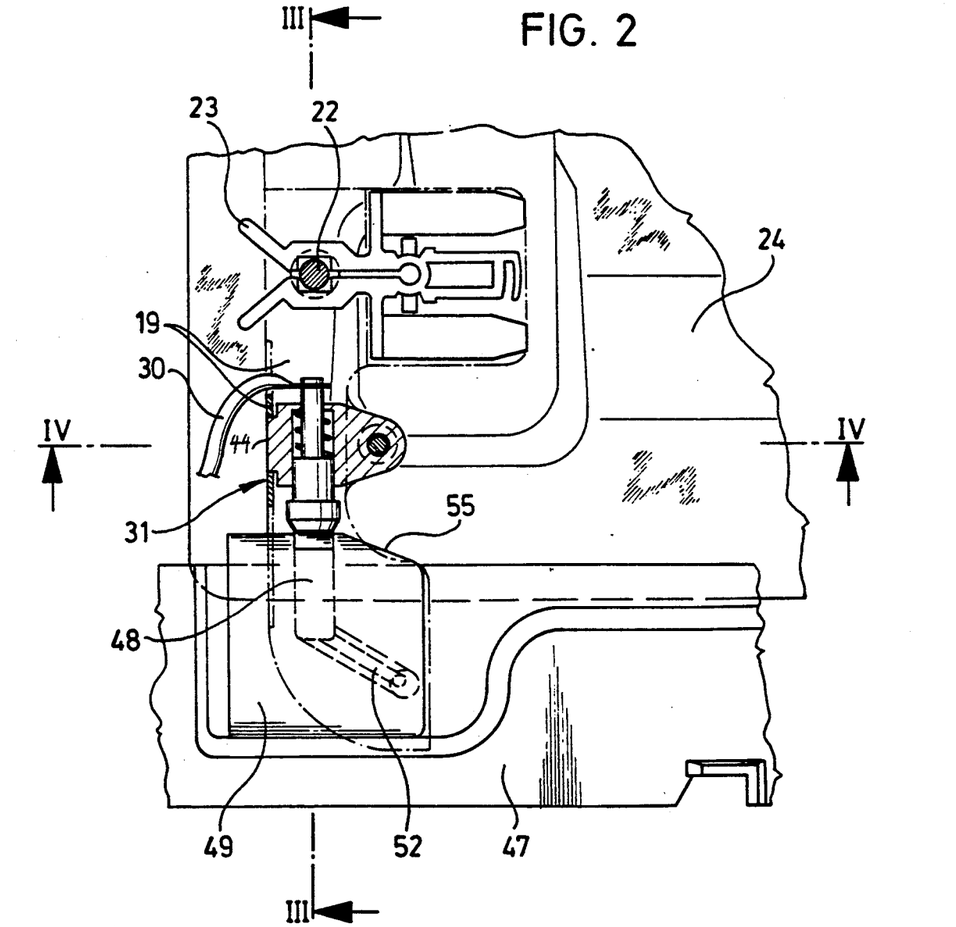
FIG. 2 is a cutaway, partial top view of the vehicle roof.
Figure 3:
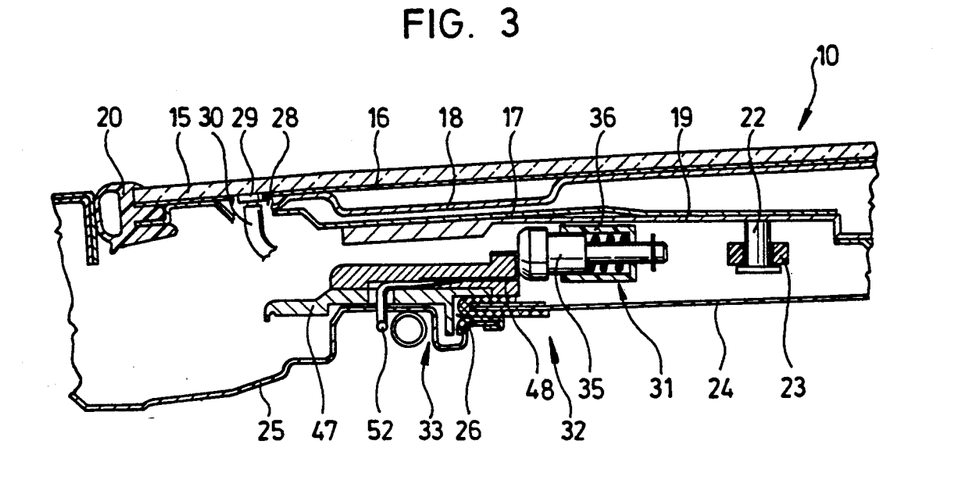
FIG. 3 is a partial section through the vehicle roof taken along line III—III of FIGS. 1 and 2.
Figure 4:
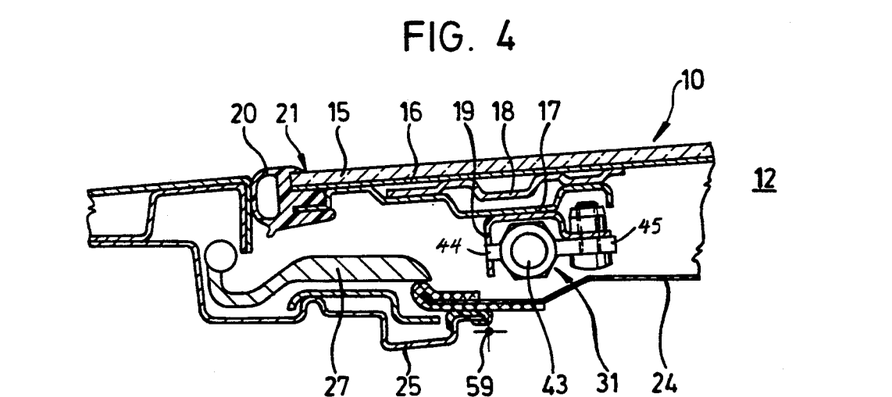
FIG. 4 is a partial section through the vehicle roof along taken along line IV—IV of FIGS. 1 and 2.
Figure 5:
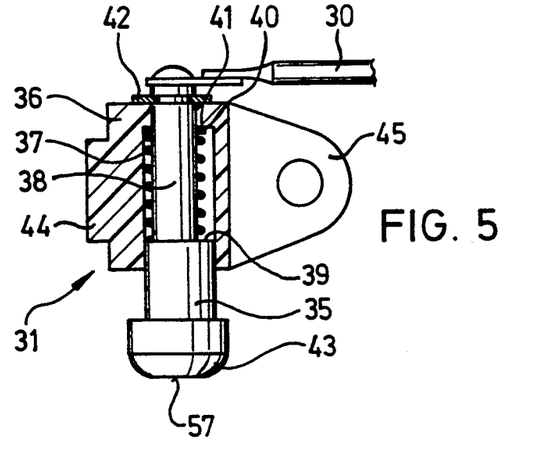
FIG. 5 is an enlarged cutaway top view of the contact plunger of the switch arrangement of the vehicle roof according to FIGS. 1 to 4.

As shown in FIG. 5, a pressure spring 37 is located in housing 36, and it grasps a plunger part 38 of reduced cross section around which it is disposed. One end of spring 37 is braced on a shoulder 39 and its other end engages on a disk 40 that is pushed over plunger part 38 and that lies against a wall 41 of housing 36. Pressure spring 37 prestresses contact plunger 35 in the direction of switch contact 33 i.e., to the left in FIG. 3, and a safety disk 42, inserted into an annular groove of contact plunger 35, limits the spring-forced plunger sliding movement by contacting the outside of housing wall 41. Contact plunger 35 has a widened, rounded plunger head 43 on its end facing switch contact 33. On one side of housing 36, it carries a projecting nose 44 that engages in a notch of mounting angle bracket 19 (FIGS. 2 and 4). On the opposite side, housing 36 has a lug 45 that is connected to mounting angle bracket 19, preferably by a bolt as shown in FIG. 4. The other end of cable 30 is attached, especially, riveted, onto the end of contact plunger 35 that faces away from plunger head 43.

Figure 6:
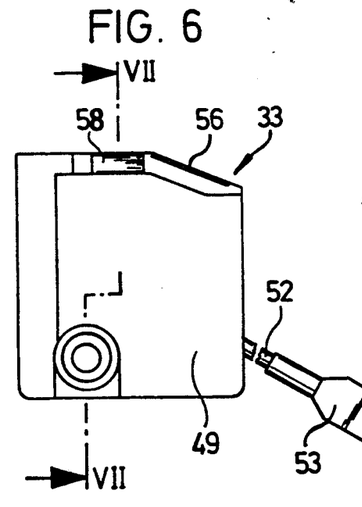
FIG. 6 is an enlarged top view of the mating contact of the switch arrangement and its carrier plate.
Figures 7, 8:
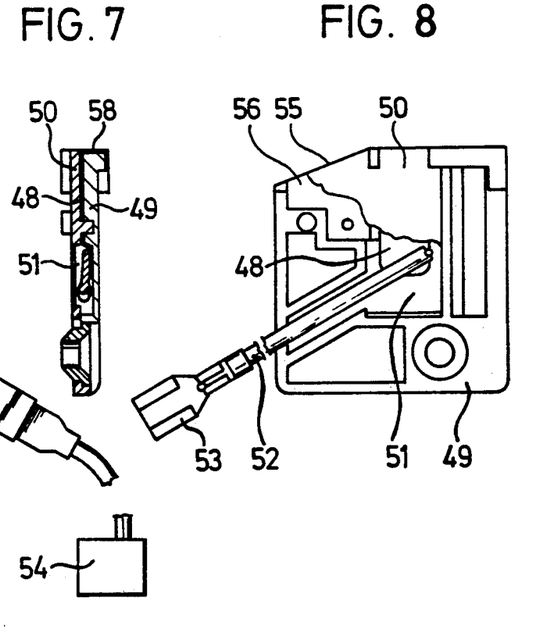
FIG. 7 is a section taken along line VII—VII of FIG. 6.
FIG. 8 is a view of the mating contact and the carrier plate according to FIGS. 6 and 7, seen from below.

A guide element 47 to which switch contact 33 is connected, for example, by screws, is attached to roof frame 25. Switch contact 33 has an inflexible mating contact in the form of a contact plate 48 that grasps, a hook-like fashion, around an edge of the plate-shaped contact carrier 49 which faces switch contact 31 (FIG. 7). Contact carrier 49, together with a covering plate 50 placed on it, delimits a hollow space 51. A connecting cable 52, that carries a flat plug 53 on one end, projects into hollow space 51 and its other end is welded there to contact plate 48. In the way indicated only diagrammatically in FIG. 6, switch contact 33 is connected by flat plug 53 to a power consuming device 54, which can involve, for example, the vehicle electrical system.

Contact carrier 49 is provided in its rear part with a contact bevel 55, and most of the length of this bevel is covered by a contact facing 56, which can be part of contact plate 48.

Plunger head 43 of contact plunger 35 and contact plate 48 form contact areas 57 or 58 that are in contact with one another in the closed position of switch arrangement 32 and both of which lie in a vertical or nearly vertical plane.

When cover 10 is slid out of its forwardmost cover position illustrated in FIGS. 1 to 4, i.e., is slid rearward, switch contacts 31 and 33 are out of contact with one another. Switch arrangement 32 is in the open position. The solar power source (solar unit 15) is electrically disconnected from the power consuming device 54. If cover 10 approaches the forwardmost cover position, contact plunger 35, which is pressed outward by pressure spring 37, strikes, with its head 43, contact bevel 55 of stationary switch contact 33. When cover 10 is slid further forward, contact bevel 55 forces contact plunger 35 to make an adjustment movement perpendicular to the cover sliding direction and against the force of pressure spring 37. This produces a self-cleaning effect between the contact materials on contact facing 56 and plunger head 43.

In the forwardmost cover position, the contact area 57 of contact plunger 35 is firmly pressed by pressure spring 37 against contact area 58 of the inflexible mating contact formed by contact plate 48. Switch arrangement 32 is now in the closed state and produces a low-resistance electrical connection between solar unit 15 and power consuming device 54. This connection is maintained as long as cover 10 is in its forwardmost position, regardless of whether the cover is in its closed position, rear edge 13 of the cover is pushed out above stationary roof membrane 11 or cover rear edge 13 is lowered below the roof surface 11. For this purpose, on the one hand, contact area 57 of contact plunger 35 has a sufficiently large surface area. On the other hand, switch arrangement 32 is installed so that the contact area 58 of switch contact 33 lies at or near the axis about which the cover pivots, this axis being indicated, only as an example, at 59 in FIG. 4.

If the power consuming device 54 involves the vehicle electrical system, the vehicle battery is also recharged from solar unit 15 when the motor is turned off, when cover 10 assumes its forwardmost position and consequently, switch arrangement 32 is closed. Thus, for example, with a parked vehicle, a fan can be fed from the vehicle electrical system, which prevents an overheating of the vehicle interior without running the risk of excessively discharging the vehicle battery. Alternatively, it is also possible to power a fan or the like directly by the solar power source.

Cover 10 is represented as an opaque cover. Instead of such a cover, a transparent solar cover also can be used, as it is described, for example, in the paper "Photovoltaic hot air purge systems" by P. Aschenbrenner, reprint from Automotive Technology International, 1989 and in German patent application P 40 06 756. In such a case, cover inside roof lining 24 is made so that, when cover 10 is closed, it can be brought if desired, independently of the cover, into a position that more or less opens roof opening 12.

Figure 9:
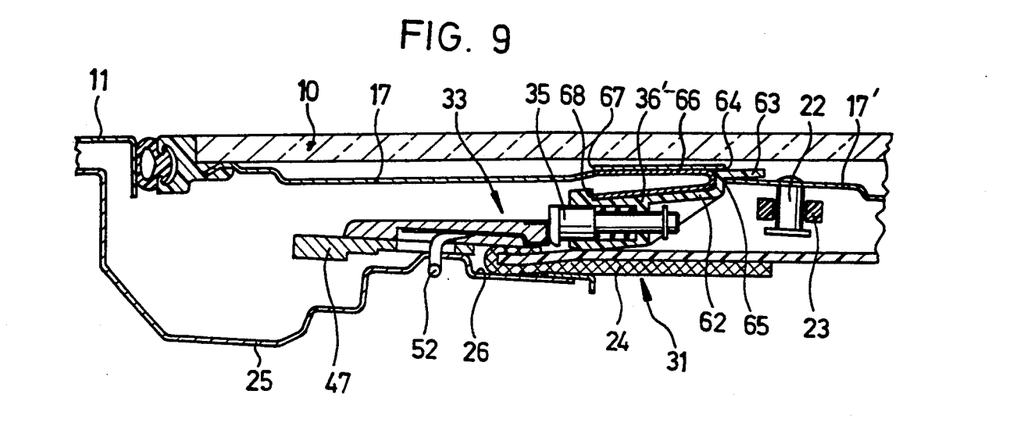
FIG. 9 is a partial section corresponding to FIG. 3 through a vehicle roof according to a modified embodiment.
Figure 10:
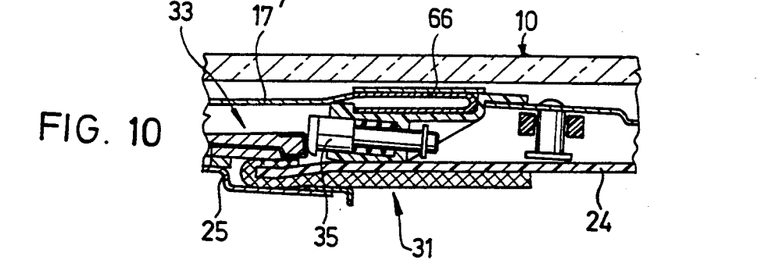
FIGS. 10 and 11, partial section corresponding to FIG. 9 for various fitting positions of the cover.
Figure 11:
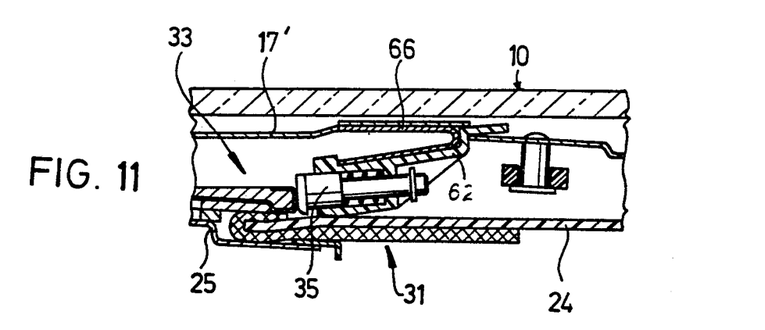

The embodiment according to FIGS. 9 to 11 differs from the embodiment explained above essentially only in that switch contact 31 has a housing 36' that is not rigidly connected to cover 10, but rather a pivot arm 62 is attached or formed on housing 36', and this arm 62 is connected to pivot on cover 10 or a part that is rigidly connected to the cover, such as on the metal inner plate 17' of the cover in the illustrated embodiment. For this purpose, an essentially S-shaped, bent pivot arm 62 has a free end 63 which engages in a slit 64 in the metal inner plate 17' of the cover 10, forming a horizontal or nearly horizontal pivot axis for pivot arm 62 at 65. Between the top side of the part of pivot arm 62 lying left of swivel axis 65 in FIG. 9 and the underside of metal inner plate 17 of the cover, a V-shaped leaf spring 66 is inserted, and each of its free ends are engaged a respective one of a lip edge 67 of metal inner plate 17' and a shoulder 68 of housing 36. Spring 66 tries to pivot housing 36, together with contact plunger 35, downward around pivot axis 65. In doing so, the underside of housing 36 is braced against the top side of the inside roof headliner 24 near a point at which cover inside roof headliner 24 lies against a respective longitudinal guide mechanism 26.

By using spring 66 to spring-load switch contact 31 in a vertical direction with respect to cover 10, the height of contact plunger 35 and its contact area 57 remain independent of differences in the height at which cover 10 is installed. This can clearly be seen from a comparison of FIGS. 9, 10 and 11 where, in FIG. 10, cover 10 is lower and in FIG. 11 cover 10 is higher with respect to roof frame 25 than in FIG. 9. Thus, also, the height of contact area 57 of switch contact 31, compared with the height of contact area 58 of switch contact 33, is maintained when the height at which cover 10 is installed is adjusted relative to stationary roof surface 11 to compensate for manufacturing tolerances. Further, cover inside roof headliner 24 is constantly pressed resiliently against longitudinal guide mechanisms 26. This reliably prevents a flapping of inside roof headliner 24 during travel without requiring additional means and measures.

Figure 12:
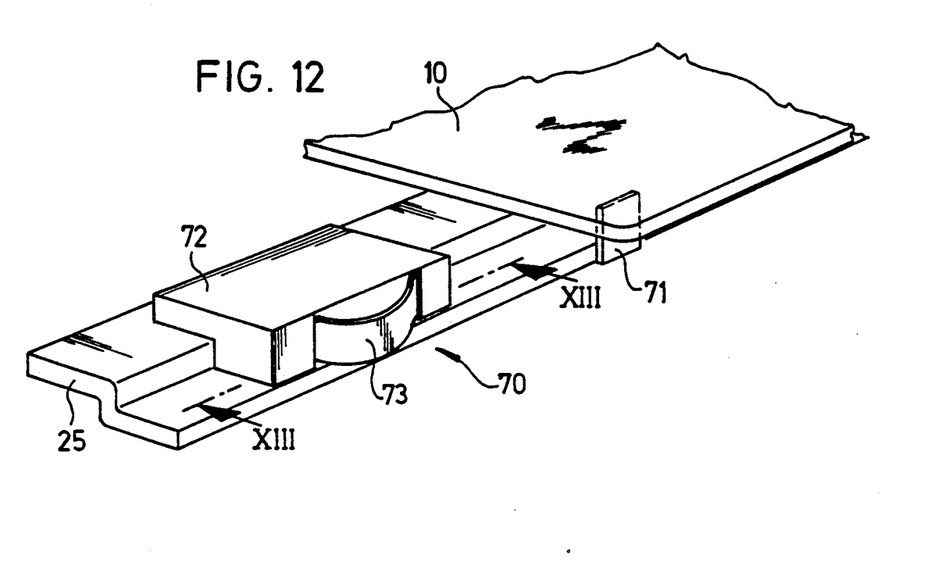
FIG. 12 is a perspective representation of a switch arrangement according to a further modified embodiment.
Figure 13:
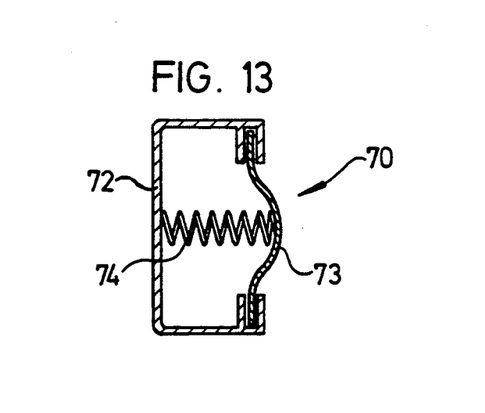
FIG. 13, the section along line XIII—XIII of FIG. 12.

In the modified embodiment represented in FIGS. 12 and 13, a resilient switch contact 70 is connected to roof frame 25 or to another part that is fixed to a stationary part of the roof, while a switch contact 71, made as an inflexible mating contact and interacting with it, is attached to cover 10 or to a part that is fixed relative to the cover. Switch contact 70 has a housing 72 from which an arched contact plate 73 projects. Contact plate 73 can, itself, be made as a contact spring and/or can be resiliently pressed outward by an additional pressure spring 74. As in the above-explained embodiment, both switch contacts 71 and 73 engage one another when cover 10 reaches its forwardmost position, and this engagement is maintained regardless of whether the cover, in its forwardmost position, is closed or pushed out with its rear edge above the stationary roof surface or is lowered under the stationary roof surface.

Figure 14:
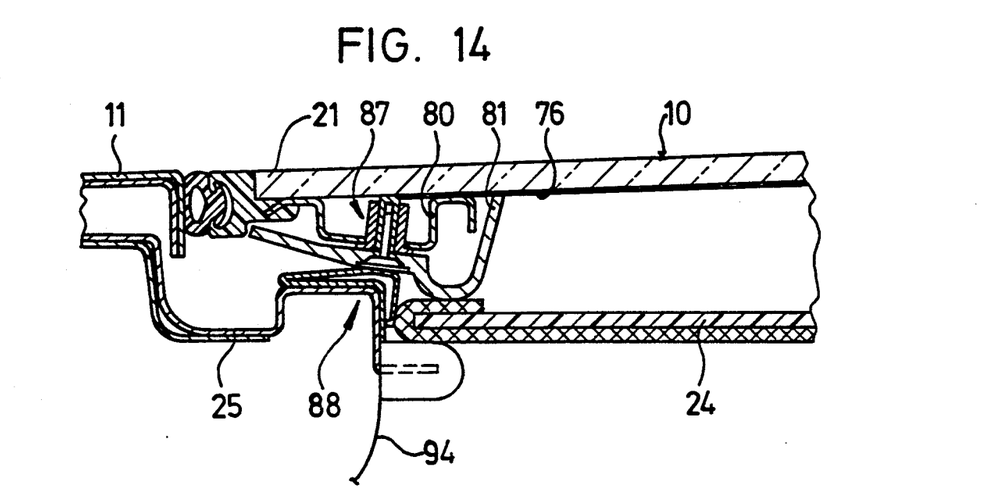
FIG. 14 is a partial longitudinal section through a vehicle roof according to a further modified embodiment with the cover in the closed position.
Figure 15:
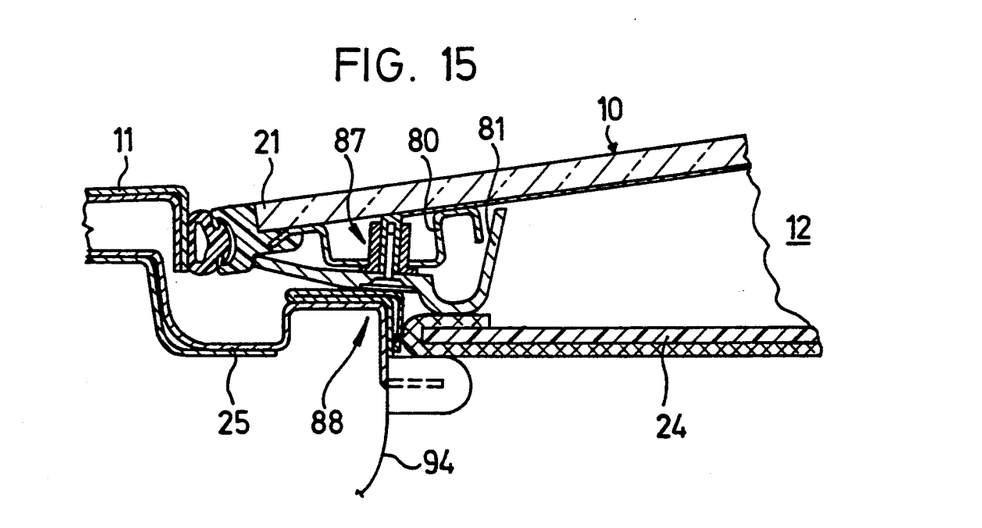
FIG. 15 is a section corresponding to FIG. 14 with the cover pushed out.
Figure 16:
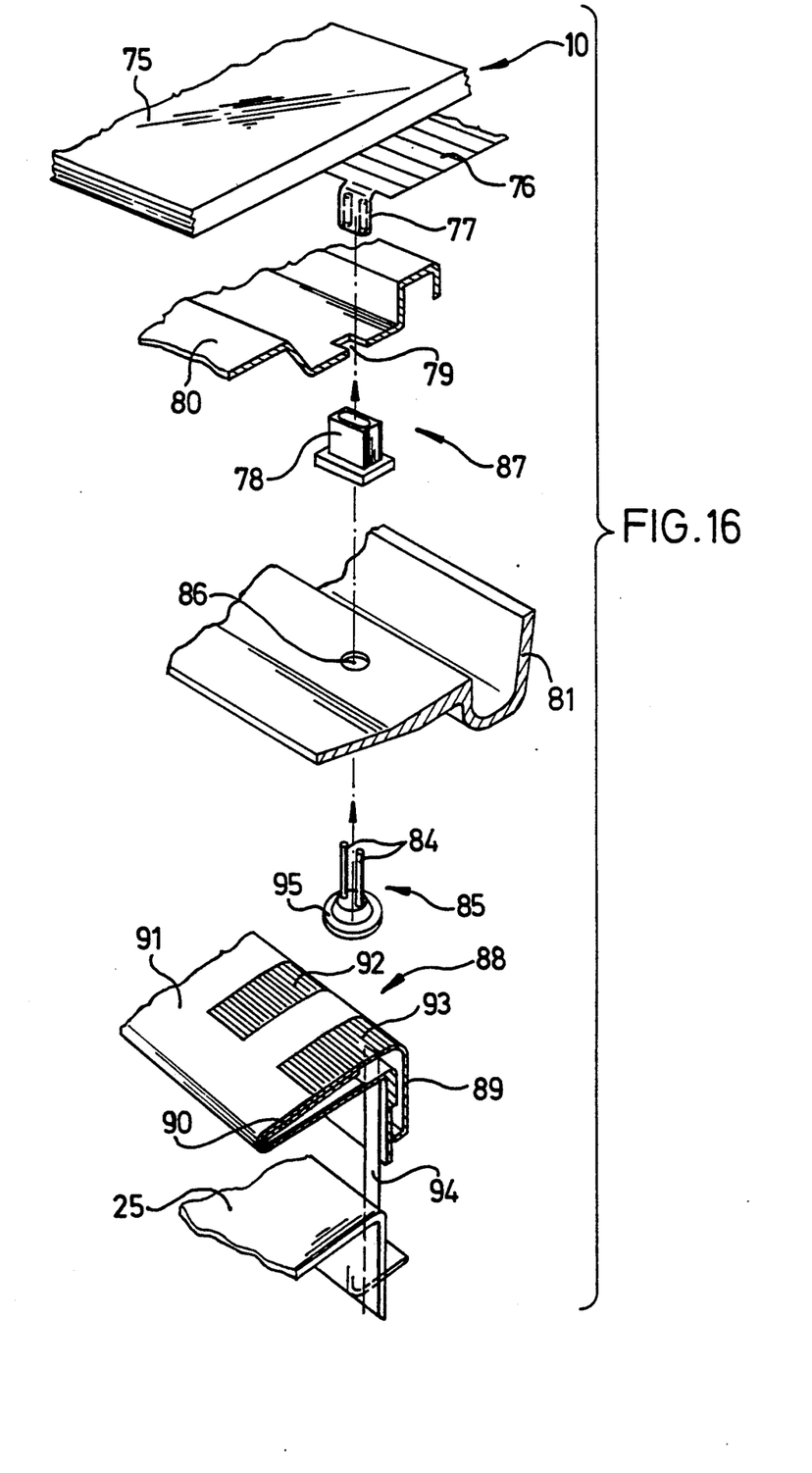
FIG. 16 is an exploded perspective representation of the switch arrangement according to FIGS. 14 and 15 and the associated roof parts.

While in the embodiments according to FIGS. 1 to 13 the contact areas coming into contact with one another of both interacting switch contacts 31, 33 or 70, 71 lie in a vertical or nearly vertical plane, FIGS. 14 to 16 show a further modified embodiment in which corresponding contact areas assume a more or less horizontal position. In the case of this embodiment, cover 10 is made transparent. For this purpose, it has a glass pane 75 on whose underside is placed a solar cell foil or layer 76 (FIG. 16). Near the cover front edge, the electrodes of solar cell foil or layer 76 are connected with two flat plugs, of which only one plug 77 is illustrated in the Figures. Flat plug 77 is received by a connector housing 78 that is inserted into a notch 79 of a frame-shaped metal inner plate 80 of the cover. The underside of the metal inner plate of the cover is covered by a screen 81. A contact plug 85, having connections 84, passes through an opening 86 of screen 81, from below, into electrically conductive contact with flat plug 77 of solar cell foil or layer 76.

Components 77, 78, 84, 85 form a switch contact 87 that is fixed with respect to the cover and which, when cover 10 assumes its forwardmost position, interacts with a switch contact 88 that is fixed with respect to a stationary part of the roof. Switch contact 88 has an elastically flexible plastic housing 89 that is rigidly connected with roof frame 25, e.g., is riveted or bonded on the latter. A leaf spring 90 is inserted into plastic housing 89 to produce an upwardly directed force on the upper part 91 of housing 89. Two adjacent, electrically conductive contact areas 92 and 93, that are electrically conductively connected to a power consuming device, for example, by a conductive foil 94, are located on the top side of housing 89.

When cover 10 approaches its forwardmost position, head 95 of contact plug 85 approaches the contact area 93 of switch contact 88, while contact area 92 engages with a second contact plug, not represented, which leads to a second connection, corresponding to flat plug 77, of solar cell foil or layer 76. In this way, the solar power source formed by solar cell foil or layer 76 is connected, to be conductive, to the consuming device. Because of the resilient flexibility of housing 89, this connection is maintained regardless of whether the forwardmost position of cover 10 is one in which it assumes its closed position (FIG. 14), a pushed out position with its rear edge above stationary roof surface 11 (FIG. 15) or a lowered position with its rear edge below the stationary roof surface to be slid rearward.

Figure 17:
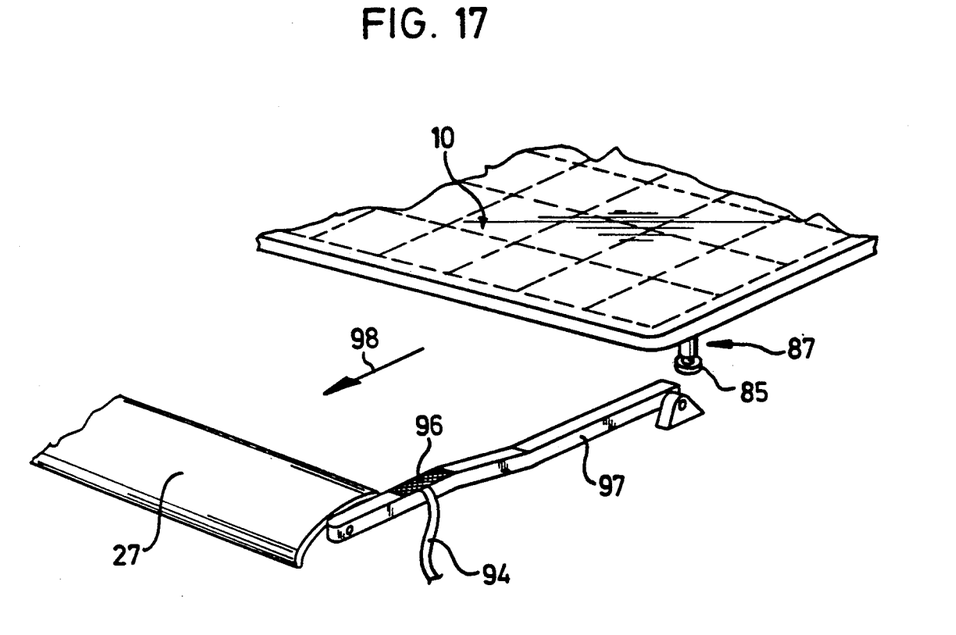
FIG. 17 is a perspective representation of a further modified embodiment.

In the modified embodiment according to FIG. 17, a switch contact 87 that corresponds, for example, to the switch contact that is fixed relative to the cover of FIGS. 14 to 16 and that is attached to cover 10 or to a part of the cover mechanism, e.g., metal inner plate 80 of the cover and/or screen 81 of FIG. 16, interacts with a switch contact 96 that is located on an otherwise conventional push-out arm 97 of wind deflector 27. Here, switch contact 87, itself, is suitably spring-mounted or is connected to be resilient with respect to the cover, such as in the manner of the contact plunger 35 of the embodiment of FIGS. 1-4. Switch contact 87 is electrically connected, in the way explained above, to the solar power source carried by cover 10, while an electrically conductive connection, e.g., in the form of conductive foil 94, leads from switch contact 96 to the power consuming device to be fed from the solar power source.

When cover 10 approaches its forwardmost position in the direction of arrow 98 of FIG. 17, wind deflector 27 is swung by a part fixed with the cover and in contact with push-out arm 97, from an operational position into a nonoperational position, and switch contact 87 engages with switch contact 96. The power consuming device which was disconnected, before, from the solar power source is, thus, connected to the solar power source. With this embodiment, switch contact 87, itself, can optionally be used to adjust wind deflector 27 in response to shifting of the cover position.

Figure 18:
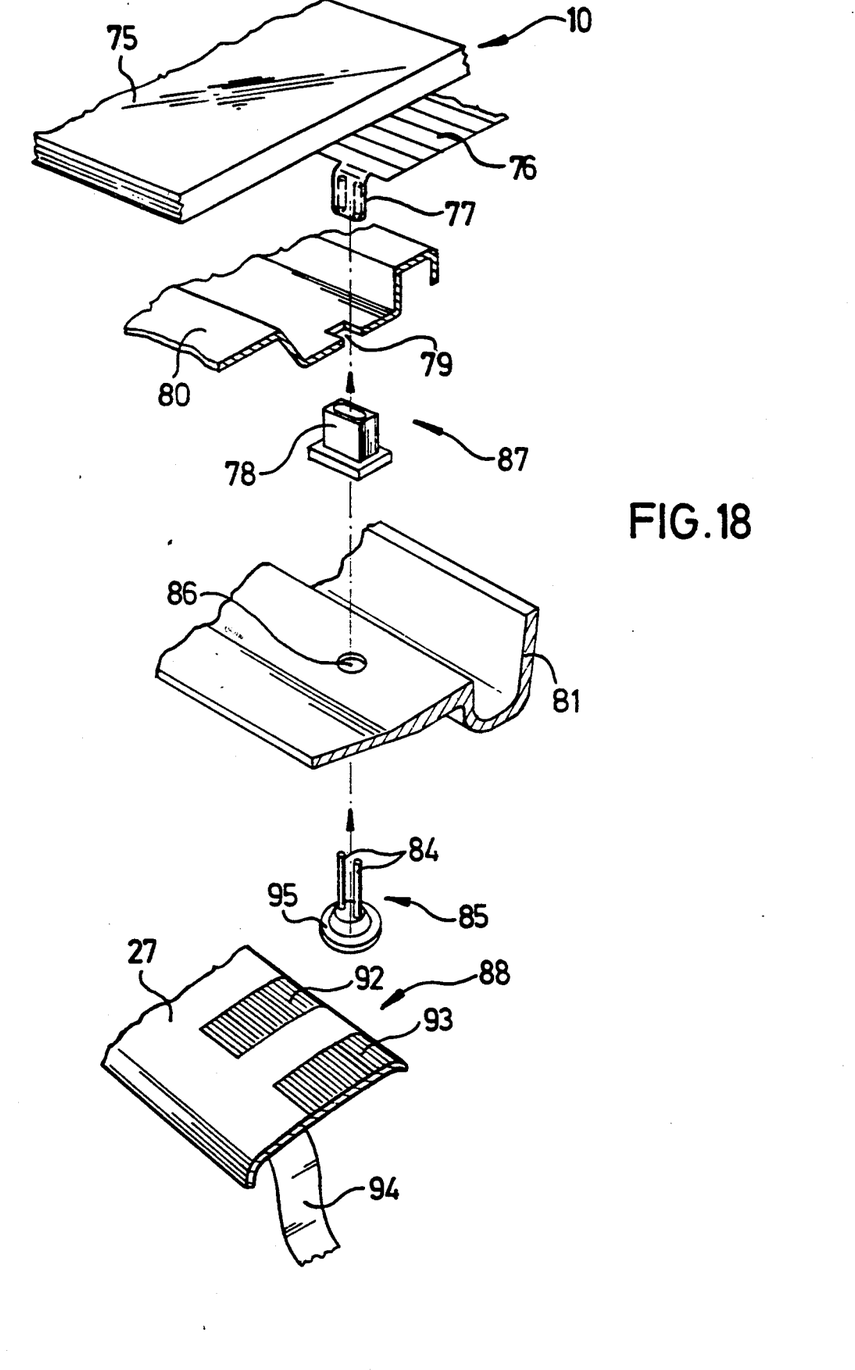
FIG. 18 is an exploded perspective view similar to FIG. 16 of a further modified embodiment of the switch arrangement.
Figure 19:
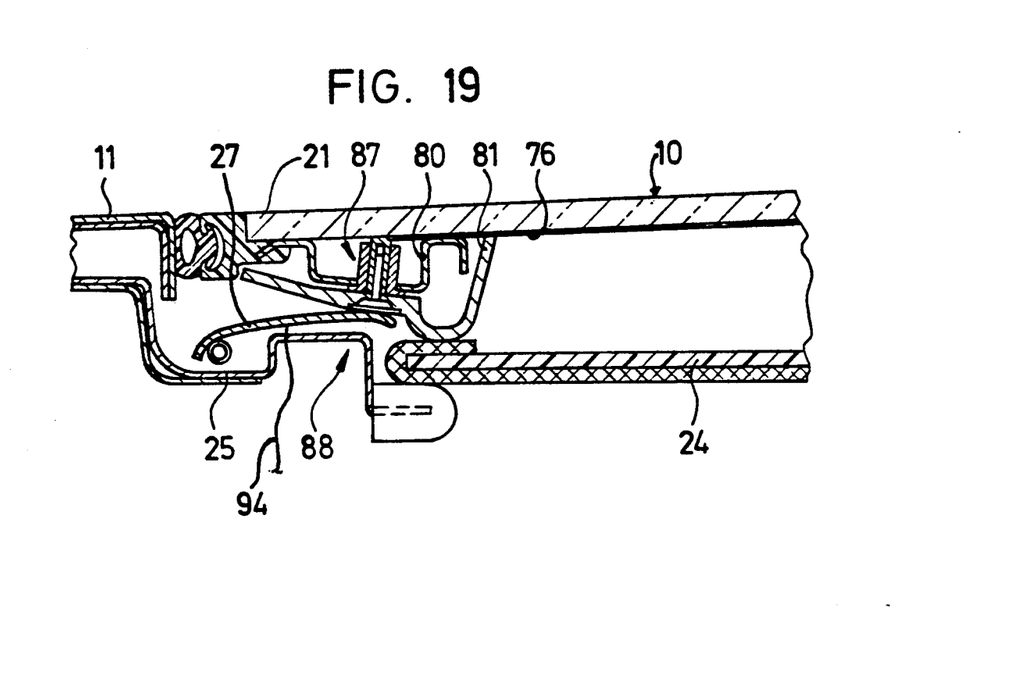
FIGS. 19 and 20 are partial longitudinal sections corresponding to FIGS. 14 and 15 for the embodiment according to FIG. 17.
Figure 20:
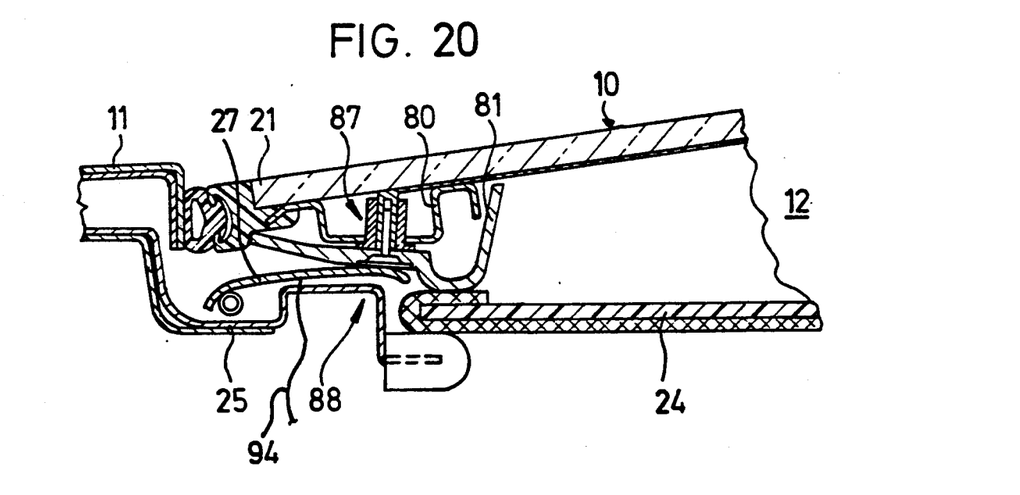

The embodiment illustrated in FIGS. 18 to 20 corresponds to that according to FIGS. 14 to 16 with the exception that contact areas 92 and 93 of switch contact 88 are made on the top side of wind deflector 27. Of course, also in this embodiment, wind deflector 27 is displaced, in a conventional way, e.g., by push-out arms 97, between a pushed-out working position and an inwardly swung nonoperational position in response to changes in the position of the cover 10. The switch arrangement made by switch contacts 87 and 88 closes when wind deflector 27 is in the nonoperational position.

We claim:

1. Vehicle roof with at least one cover carrying a solar power source for alternatively closing or at least partially opening a roof opening in a fixed roof surface, with at least one power consuming device that is fed from the solar power source and that is separate from the cover, and with a contact device to produce an electrical connection between the solar power source and the consuming device; wherein the contact device comprises a switch arrangement incorporating the cover which, in at least one predetermined cover position, is closed to connect the power consuming device to the solar power source and is opened to disconnect the power consuming device from the solar power source when the cover is displaced from said at least one predetermined cover position; wherein the cover is supported for displacement on a roof frame that is fixed to said stationary roof surface; wherein said at least one position is a forwardmost position and the switch arrangement closes in said forwardmost position of the cover; wherein cover pivot means is provided for enabling the cover to pivot, in said forwardmost cover position, alternatively, between a closed forwardmost position, and at least one of a forwardmost position where a rear edge of the cover is raised relative to said roof frame and a forwardmost position where the rear edge of the cover is lowered relative to said roof frame; wherein the switch arrangement remains closed in each of said forwardmost positions; wherein the switch arrangement comprises at least one cover-carried switch contact that is connected to the cover and at least one stationary switch contact which is connected to a stationary part of the roof, said cover-carried switch contact contacting said stationary contact in said at least one predetermined cover position; and wherein contact areas of the switch contacts contact one another in a substantially vertical plane.

2. Vehicle roof according to claim 1, wherein at least one of said switch contacts is in the form of at least one of a resilient and spring-mounted switch contact.

3. Vehicle roof according to claim 2, wherein one of the switch contacts comprises a resilient, prestressed contact plunger and the other of the switch contacts comprises an inflexible mating contact.

4. Vehicle roof according to claim 1, wherein a contact area of the cover-carried switch contact lies near a pivot axis of the cover.

5. Vehicle roof with at least one cover carrying a solar power source for alternatively closing or at least partially opening a roof opening in a fixed roof surface, with at least one power consuming device that is fed from the solar power source and that is separate from the cover, and with a contact device to produce an electrical connection between the solar power source and the consuming device; wherein the contact device comprises a switch arrangement incorporating the cover which, in at least one predetermined cover position, is closed to connect the power consuming device to the solar power source and is opened to disconnect the power consuming device from the solar power source when the cover is displaced from said at least one predetermined cover position; wherein the cover is supported for displacement on a roof frame that is fixed to said stationary roof surface; wherein said at least one position is a forwardmost position and the switch arrangement closes in said forwardmost position of the cover; wherein cover pivot means is provided for enabling the cover to pivot, in said forwardmost cover position, alternatively, between a closed forwardmost position, and at least one of a forwardmost position where a rear edge of the cover is raised relative to said roof frame and a forwardmost position where the rear edge of the cover is lowered relative to said roof frame; wherein the switch arrangement remains closed in each of said forwardmost positions; wherein the switch arrangement comprises at least one cover-carried switch contact that is connected to the cover and at least one stationary part of the roof, said cover-carried switch contact contacting said stationary contact in said at least one predetermined cover position; wherein a resilient means for resiliently prestressing a carrier part of the cover-carried switch contact relative to the cover in a vertical direction is provided; and wherein the carrier part is braced against an inside roof headliner, said roof headliner being located under the cover and slidable along guide mechanisms which are connected to the fixed roof surface.

6. Vehicle roof according to claim 5, wherein the carrier part is mounted to pivot on a part that is fixed to the cover around a substantially horizontal axis.

7. Vehicle roof according to claim 1, wherein the cover-carried switch contact has a carrier part is mounted to pivot on a part that is fixed to the cover around a substantially horizontal axis.

8. Vehicle roof according to claim 1, wherein a carrier part of the cover-carried switch contact is resiliently prestressed relative to the cover in a vertical direction.

* * * * *